D. CURTIS.
Horse-Collar Linings.

No. 138,383. Patented April 29, 1873.

Witnesses.

Inventor.
D. Curtis
by his Atty's

UNITED STATES PATENT OFFICE.

DEXTER CURTIS, OF SUN PRAIRIE, WISCONSIN.

IMPROVEMENT IN HORSE-COLLAR LININGS.

Specification forming part of Letters Patent No. 138,383, dated April 29, 1873; application filed February 24, 1873.

*To all whom it may concern:*

Be it known that I, DEXTER CURTIS, of Sun Prairie, in the county of Dane and State of Wisconsin, have invented a new and Improved Lining for Horse Collars and Harness; and I do hereby declare the following to be a full, clear, and exact description of the same, reference being had to the accompanying drawing forming part of this specification, in which—

Figure 1:
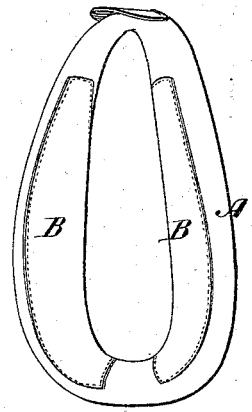
Figure 3:
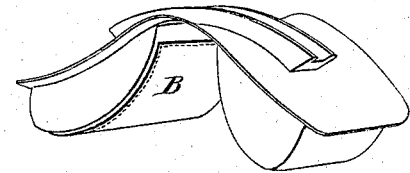
Figure 2:
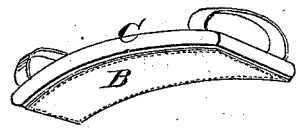

Figure 1 is a perspective view of a horse-collar lined in accordance with my invention. Fig. 2 is a similar view of a horse-collar pad, and Fig. 3 of a harness-saddle.

Similar letters of reference denote corresponding parts in the several figures of the drawing.

My invention has for its object to prevent the contact or bearing surfaces of horse-collars and other parts of a harness or saddle from chafing and galling the flesh of the animal, and to heal the flesh when galled or chafed. To this end the invention consists in the application of an imperforate sheet-lead lining to such parts of the harness as produce or are liable to produce the gall or chafe.

In the accompanying drawing, A is a horse-collar, of ordinary or suitable construction; and B, the imperforate sheet-lead lining, formed into the shape, or approximating thereto, to fit the part or parts of the collar to which it is to be applied. It is secured to the collar by stitching, nailing, or other convenient and proper means. The lining for the collar may be made in several pieces, applied to the sides and top, or to the sides only; or of one sheet extending along the sides and top, or across the bottom and sides; or completely around the sides, top, and bottom. In Fig. 2 the lining is shown applied to collar-pads C, and in Fig. 3 to a harness-saddle, D.

The form of the lead lining may be varied indefinitely, of course, to correspond to the part of the harness to which it is to be applied; and it should be made sufficiently large to present an imperforate surface over the parts of the animal to be protected so as to cover the edges of the wound, if any should exist. The flexibility of the sheet-lead causes the lining to conform readily in shape to the part of the harness to which it is to be applied, and to yield and bend so as to bear uniformly upon the animal.

In my former patents for the use of a zinc surface to form a lining for the parts of a harness, I have described the medicinal advantages resulting from the use of zinc, and certain mechanical and chemical effects, all of which have a tendency to prevent galling and chafing, as well as to cure the flesh when galled or chafed.

The sheet-lead lining produces the same effects or substantially the same, and possesses the additional advantage of flexibility, whereby it yields readily to fit the animal and the corresponding parts of the harness, while the stiffness or rigidity of the zinc sometimes renders difficult its formation into the requisite shape to fit the same parts uniformly.

Having thus described my invention, what I claim is—

A lining for horse-collars, collar-pads, and other parts of a harness, formed of imperforate sheet-lead, and applied to the parts to conform to their bearing-surfaces and to the corresponding parts of the animal, substantially as described, for the purposes specified.

DEXTER CURTIS.

Witnesses:
J. H. CARPENTER,
G. J. BARKER.